UNITED STATES PATENT OFFICE.

JOHN C. MALLONEE, OF CHARLESTON, SOUTH CAROLINA.

MIXED PAINT.

SPECIFICATION forming part of Letters Patent No. 341,588, dated May 11, 1886.

Application filed October 13, 1885. Serial No. 179,771. (No specimens.)

*To all whom it may concern:*

Be it known that I, JOHN C. MALLONEE, of Charleston, in the county of Charleston and State of South Carolina, have invented certain new and useful Improvements in Paint; and I do hereby declare the following to be a full, clear, and exact description of the invention, such as will enable others skilled in the art to which it appertains to make and use the same.

My invention relates to an improvement in paint.

Heretofore it has been customary to grind dry pigments in linseed-oil, in order to secure a thorough mixture of the oil and pigments. Pine-wood oil has also been considered of slight value as a paint-oil on account of the difficulty experienced in combining it with the pigments and reducing the mixture to a paint.

The object of my present invention is to provide a method by which dry pigments may be mixed with oil as thoroughly as when ground therein, and at the same time adapt pine-wood oil to use as a paint-oil, a further object being to provide an economical paint as the result of said method.

With these ends in view my invention consists in mixing the desired pigment with pine-wood oil, then adding to the mixture a sufficient quantity of litharge dissolved in pine-wood oil to reduce the mixture to the required consistence.

My invention further consists in a paint produced by the above-described method.

My method of procedure is more particularly as follows: Take about one-half pound of litharge to one gallon of pine-wood oil, mix enough of the oil with the litharge to dissolve it, then mix one or more dry pigments—such as asphaltum, chrome-yellow, or any other dry pigment used for paint—with the remainder of the oil to give the paint the desired color or shade. The dissolved litharge is then added to the mixture of oil and pigments until the same is reduced to the required consistence for painting purposes. This method of mixing the several ingredients will produce as complete a mixture as when the pigments are ground in linseed-oil, and it will prepare the pine-wood oil to serve as a paint-oil, nearly if not quite equivalent in value to the best linseed-oil.

Having fully described my invention, what I claim as new, and desire to secure by Letters Patent, is—

A paint consisting essentially of coloring-pigments, pine-wood oil, and litharge, substantially as set forth.

In testimony whereof I have signed this specification in the presence of two subscribing witnesses.

JOHN C. MALLONEE.

Witnesses:
GEORGE S. BROWN,
J. N. MALLONEE.